US005740317A

United States Patent [19]
Sedlmeyer et al.

[11] Patent Number: 5,740,317
[45] Date of Patent: Apr. 14, 1998

[54] PROCESS FOR FINDING THE OVERALL MONITORING THRESHOLD DURING A BIT-RATE-REDUCING SOURCE CODING

[75] Inventors: Robert Sedlmeyer, Ismaning; Andreas Brefort, Krefeld; Jens Groh, München; Wolfgang Krafft, München; Klaus Rosinski, München; Detlef Wiese, Neufahrn; Gerhard Stoll, Zolling; Martin Link, München, all of Germany

[73] Assignee: Institut Fuer Rundfunktechnik GmbH, Munich, Germany

[21] Appl. No.: 520,765

[22] PCT Filed: Jul. 21, 1992

[86] PCT No.: PCT/EP92/01658

§ 371 Date: Sep. 17, 1993

§ 102(e) Date: Sep. 17, 1993

[87] PCT Pub. No.: WO93/02508

PCT Pub. Date: Feb. 4, 1993

Related U.S. Application Data

[63] Continuation of Ser. No. 119,109, Sep. 17, 1993, abandoned.

[30] Foreign Application Priority Data

Jul. 24, 1991 [DE] Germany .................. 4124493.1

[51] Int. Cl.$^6$ .................. G10L 7/02; H04B 1/66
[52] U.S. Cl. .................. 395/2.36; 395/2.14; 395/2.92
[58] Field of Search .................. 395/2, 2.1, 2.35–2.39, 395/2.92, 2.14, 2.15; 381/36–40

[56] References Cited

U.S. PATENT DOCUMENTS 4,862,346  8/1989  Wagner et al. .................. 395/400
4,972,484  11/1990  Theile et al. .................. 395/2.36
5,353,375  10/1994  Gotu et al. .................. 395/2.39

FOREIGN PATENT DOCUMENTS 0176243      4/1986   European Pat. Off. .
0420745A2    4/1991   European Pat. Off. .
0424162A2    4/1991   European Pat. Off. .
88/04117     6/1988   WIPO .
88/10035     12/1988  WIPO .

Primary Examiner—Allen R. MacDonald
Assistant Examiner—Donald L. Storm
Attorney, Agent, or Firm—Spencer & Frank

[57] ABSTRACT

Source coding digitized audio signals includes providing time or spectral domain sampling values of the digitized audio signal, requantizing the sampling values according their permissible quantizing noise as determined by a coding and requantizing control signal, and multiplexing the control signal and the requantized sampling values into a time multiplex frame depending on the bit rate reduction employed. The coding and requantizing control signal is determined from the sampling values by determining the global masking effect from all relevant maskers which are tonal maskers and noise maskers, and which result from the sampling values, and from a silence audio threshold. The global masking effect is determined by segmenting masking edges of possible maskers and approximating in individual segments with lower order polynomials, and determining coefficients of the lower order polynomials, converting the maskers into logarithmic levels and using intensities of the maskers to determine the coefficients of the lower order polynomials, and determining the global masking threshold, step-wise, masker by masker, at individual possible base points, from the polynomials describing masking edges of the possible maskers.

18 Claims, 6 Drawing Sheets

FIG. 5

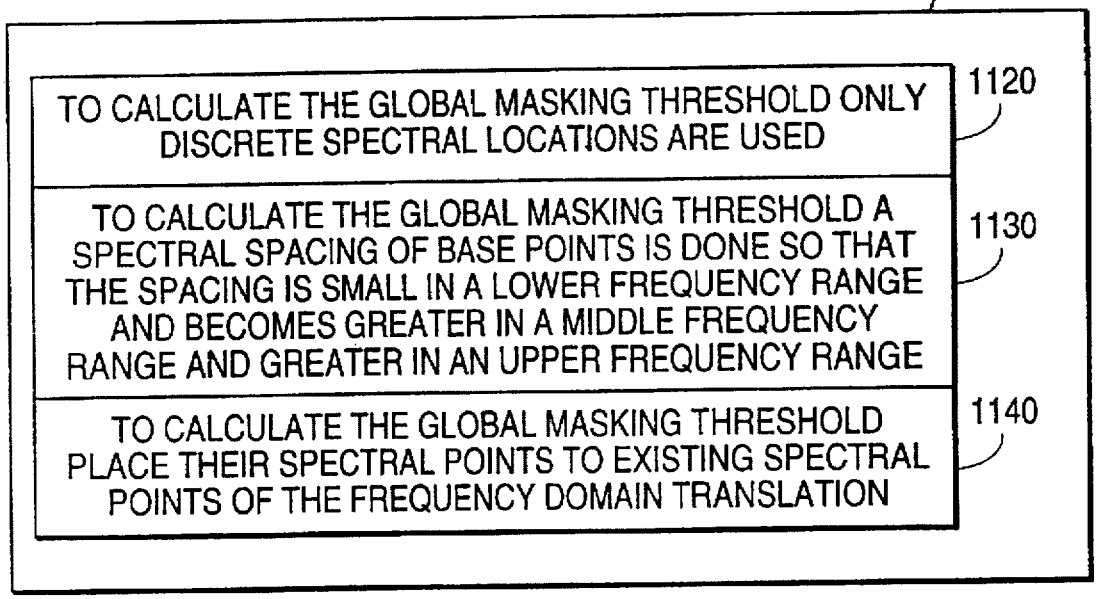

| | |
|---|---|
| TO CALCULATE THE GLOBAL MASKING THRESHOLD ONLY DISCRETE SPECTRAL LOCATIONS ARE USED | 1120 |
| TO CALCULATE THE GLOBAL MASKING THRESHOLD A SPECTRAL SPACING OF BASE POINTS IS DONE SO THAT THE SPACING IS SMALL IN A LOWER FREQUENCY RANGE AND BECOMES GREATER IN A MIDDLE FREQUENCY RANGE AND GREATER IN AN UPPER FREQUENCY RANGE | 1130 |
| TO CALCULATE THE GLOBAL MASKING THRESHOLD PLACE THEIR SPECTRAL POINTS TO EXISTING SPECTRAL POINTS OF THE FREQUENCY DOMAIN TRANSLATION | 1140 |

FIG. 7

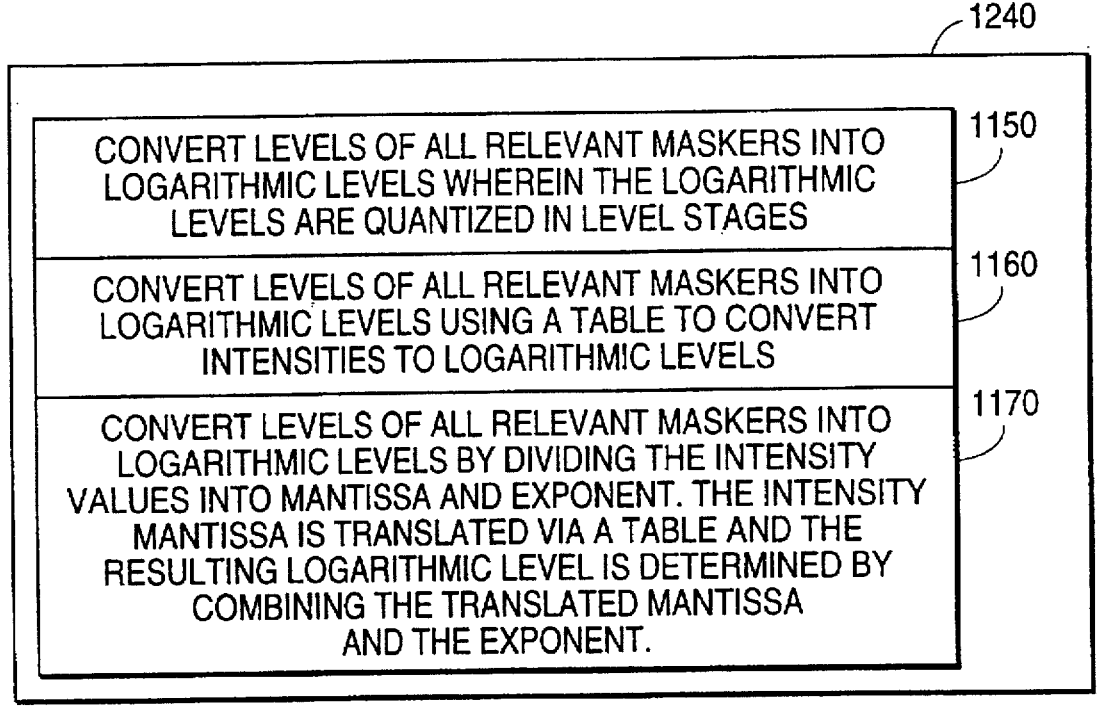

| | |
|---|---|
| CONVERT LEVELS OF ALL RELEVANT MASKERS INTO LOGARITHMIC LEVELS WHEREIN THE LOGARITHMIC LEVELS ARE QUANTIZED IN LEVEL STAGES | 1150 |
| CONVERT LEVELS OF ALL RELEVANT MASKERS INTO LOGARITHMIC LEVELS USING A TABLE TO CONVERT INTENSITIES TO LOGARITHMIC LEVELS | 1160 |
| CONVERT LEVELS OF ALL RELEVANT MASKERS INTO LOGARITHMIC LEVELS BY DIVIDING THE INTENSITY VALUES INTO MANTISSA AND EXPONENT. THE INTENSITY MANTISSA IS TRANSLATED VIA A TABLE AND THE RESULTING LOGARITHMIC LEVEL IS DETERMINED BY COMBINING THE TRANSLATED MANTISSA AND THE EXPONENT. | 1170 |

PROCESS FOR FINDING THE OVERALL MONITORING THRESHOLD DURING A BIT-RATE-REDUCING SOURCE CODING

This application is a continuation of application Ser. No. 08/119,109, filed Sep. 17, 1993 (now abandoned).

BACKGROUND OF THE INVENTION

1. Field of the Invention

The invention relates to a method of determining the global masking threshold in a bit rate reducing source coding process.

2. Background Information

To code digital audio signals by means of bit rate reducing coding methods, WO 88/04,117 discloses the calculation of the spectral masking threshold in order to obtain a requantization rule.

Since the signals to be transmitted are not composed of only a single tone but of a plurality of harmonics, the masking thresholds created by such signals differ considerably. Their calculation requires a consideration of all relevant tonal maskers and of all relevant noise maskers, each having frequency and level specific masking edges. Such an extensive consideration requires a correspondingly high calculating effort in the source coder which is justified only for a computer simulation but not for a real time realization.

SUMMARY OF THE INVENTION

In contrast thereto, it is the object of the invention to reduce the calculating effort for a bit rate reducing source coding process particularly for real time applications.

Advantageous features and modifications of the method according to the invention are defined in the following description.

BRIEF DESCRIPTION OF THE DRAWINGS

The invention will be described in greater detail with reference to the drawings, in which:

FIGS. 3–7 are flow charts of the inventive method.

DETAILED DESCRIPTION OF THE PREFERRED EMBODIMENT(S)

Figure 1:
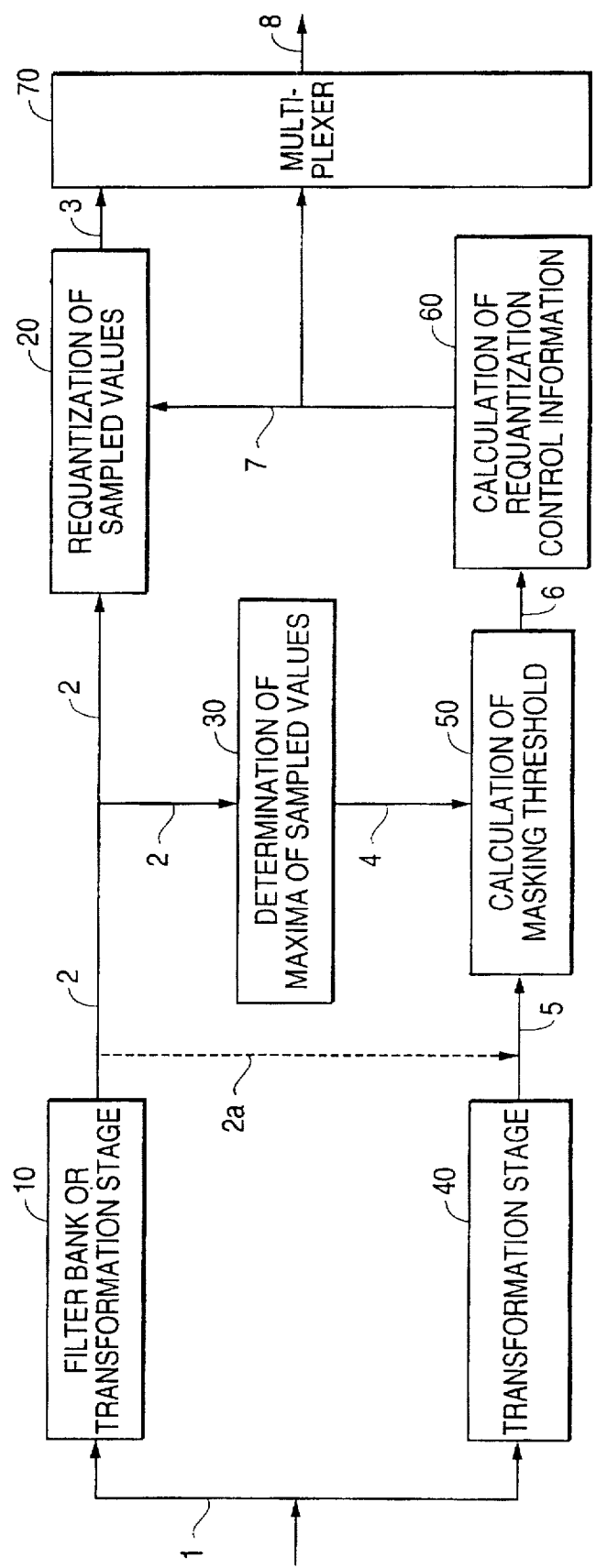
FIG. 1 depicts a block circuit diagram of a source coder for implementing the method according to the invention.

In the block circuit diagram of FIG. 1, the digitized audio signal 1 at the input is fed, in the case of sub-band coding, to a polyphase filter bank 10 which produces sub-band sampling values 2 (step 1180). In the case of transformation coding, filter bank 10 is replaced by a time/frequency transformation stage which produces discrete, spectral sampling values, for example, corresponding to a cosine or a fast Fourier transformation. Sampling values 2 are requantized in a quantizing stage 20 according to their permissible quantizing noise as determined by a coding and requantizing control signal 7 (step 1190). In order to form an output signal 8, control signal 7 is fed, together with the requantized sampling values 3, to a multiplexer 70 which inserts signals 3 and 7 into a time multiplex frame depending on the bit rate reduction method employed (step 1200).

The digitized audio signal 1 at the input is also fed to a transformation stage 40 which, in the case of sub-band coding, produces discrete spectral sampling values 5 (step 1280). In the case of transformation coding, the spectral sampling values determined in the time/frequency transformation stage can be employed as sampling values 5 (path 2a shown in dashed lines). According to a procedure (step 1220) specific to the invention to be described in greater detail below, a stage 50 calculates the global masking threshold 6 from sampling values 5 and possibly the maximum signal levels 4.

For sub-band coding, a stage 30 additionally determines the maximum signal levels 4 in the individual sub-bands from the sampling values 2.

Figure 3:
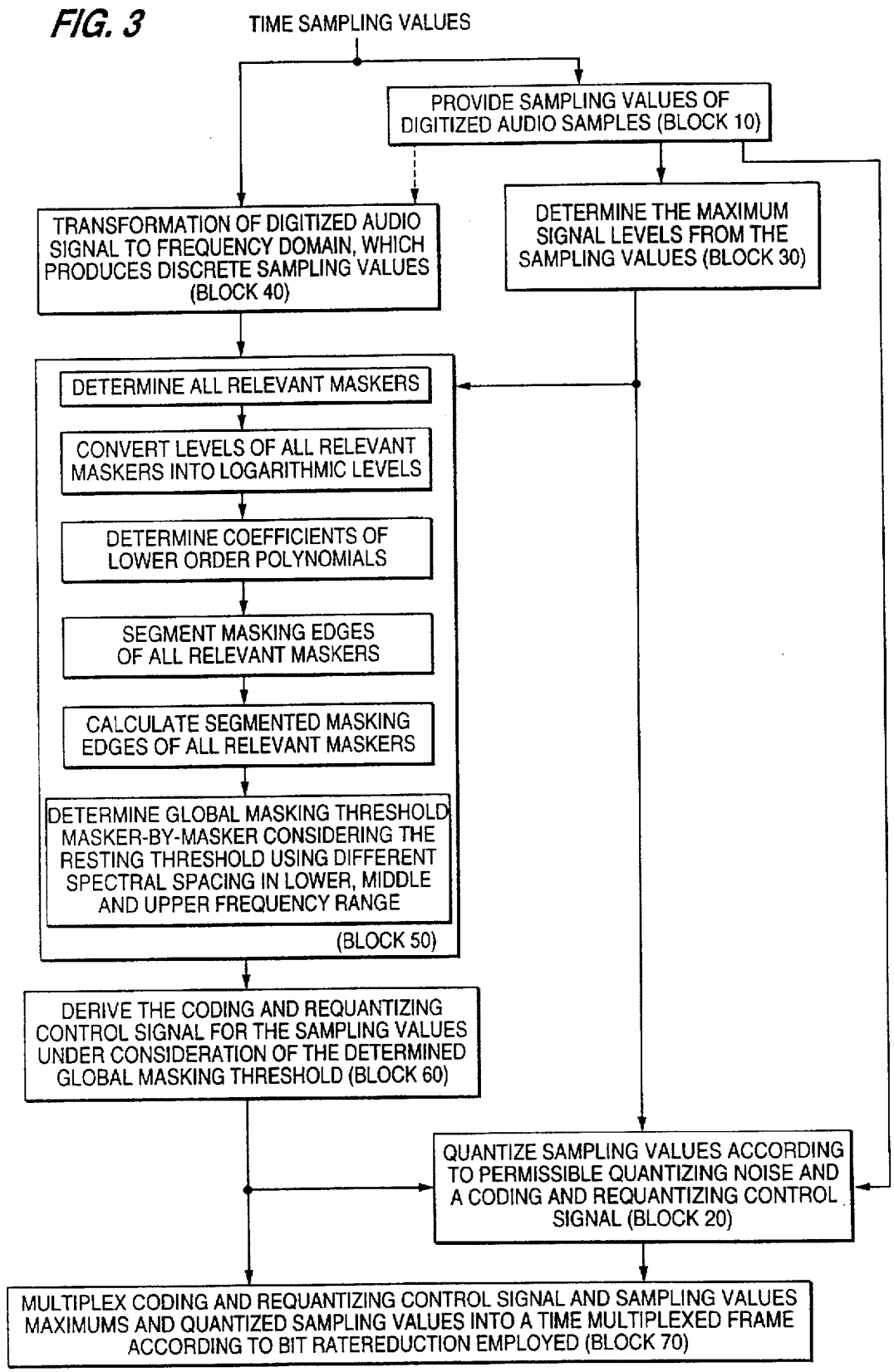
Figure 4:
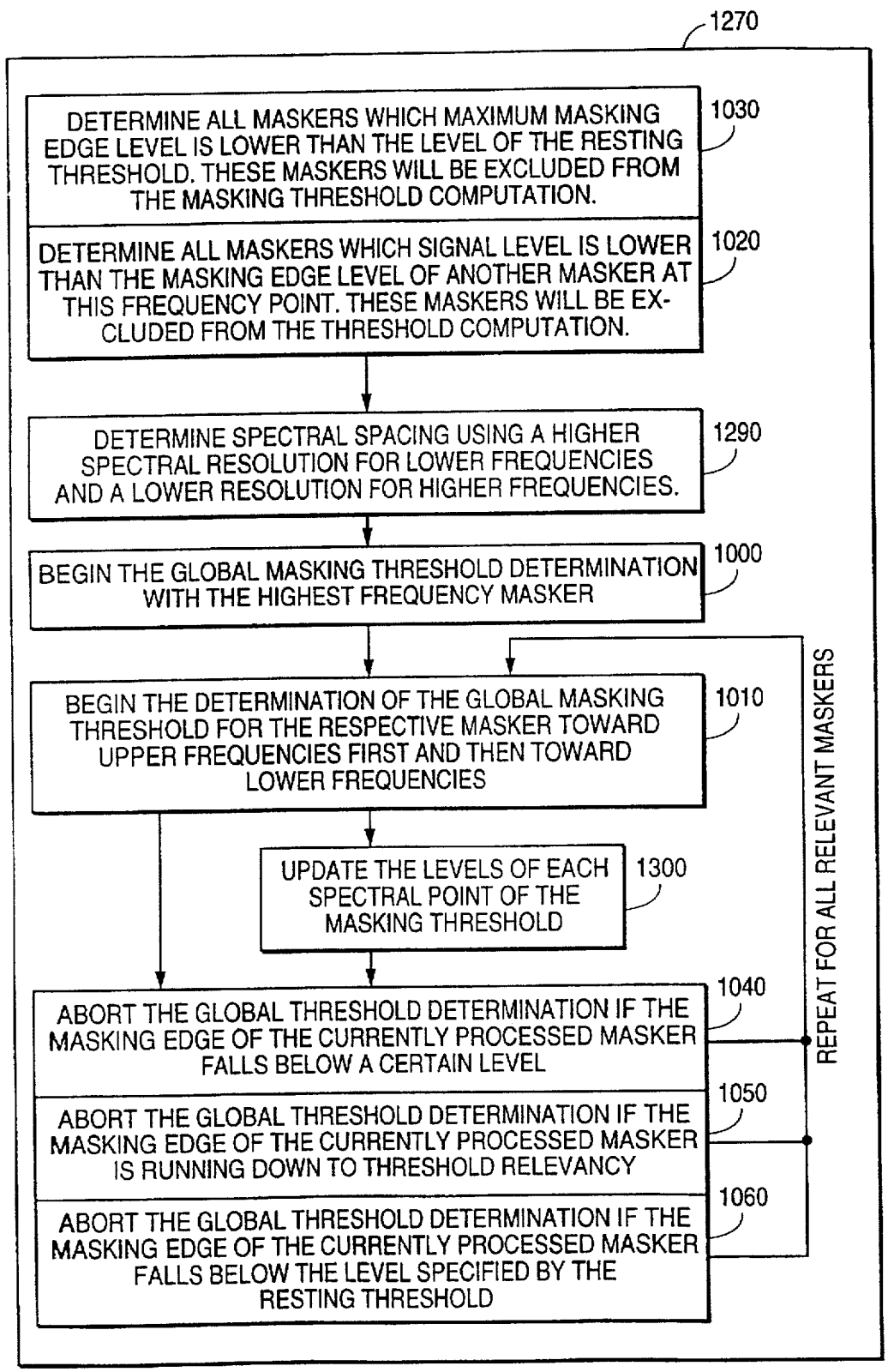
Figure 6:
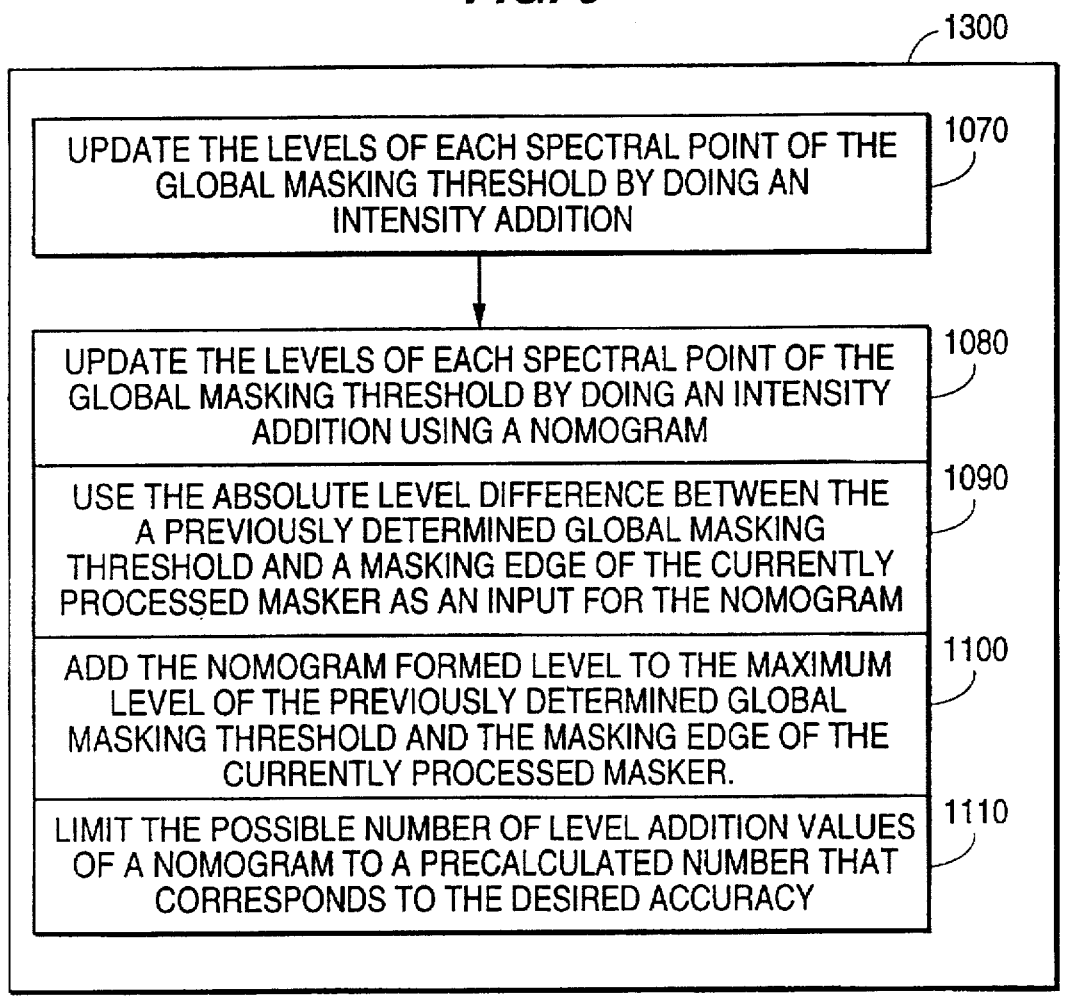

In a stage 60, the above-mentioned coding and requantizing control signal 7 is produced from the global masking threshold 6. Stage 60 is described in FIG. 3, information blocks 5.5 and 5.3, of the above-mentioned WO 88/04,117 which is expressly referred to. In the mentioned information block 5.5, the relationship between maximum occurring (masking) sub-band level and minimum global masking threshold is determined (according to permissible quantizing noise), from which, in the subsequent information block 5.3, the sub-band association of the quantization (=resolution) is calculated.

The calculation of global masking threshold 6 (step 1220) will now be described in greater detail with reference to FIG. 2.

Figure 2:
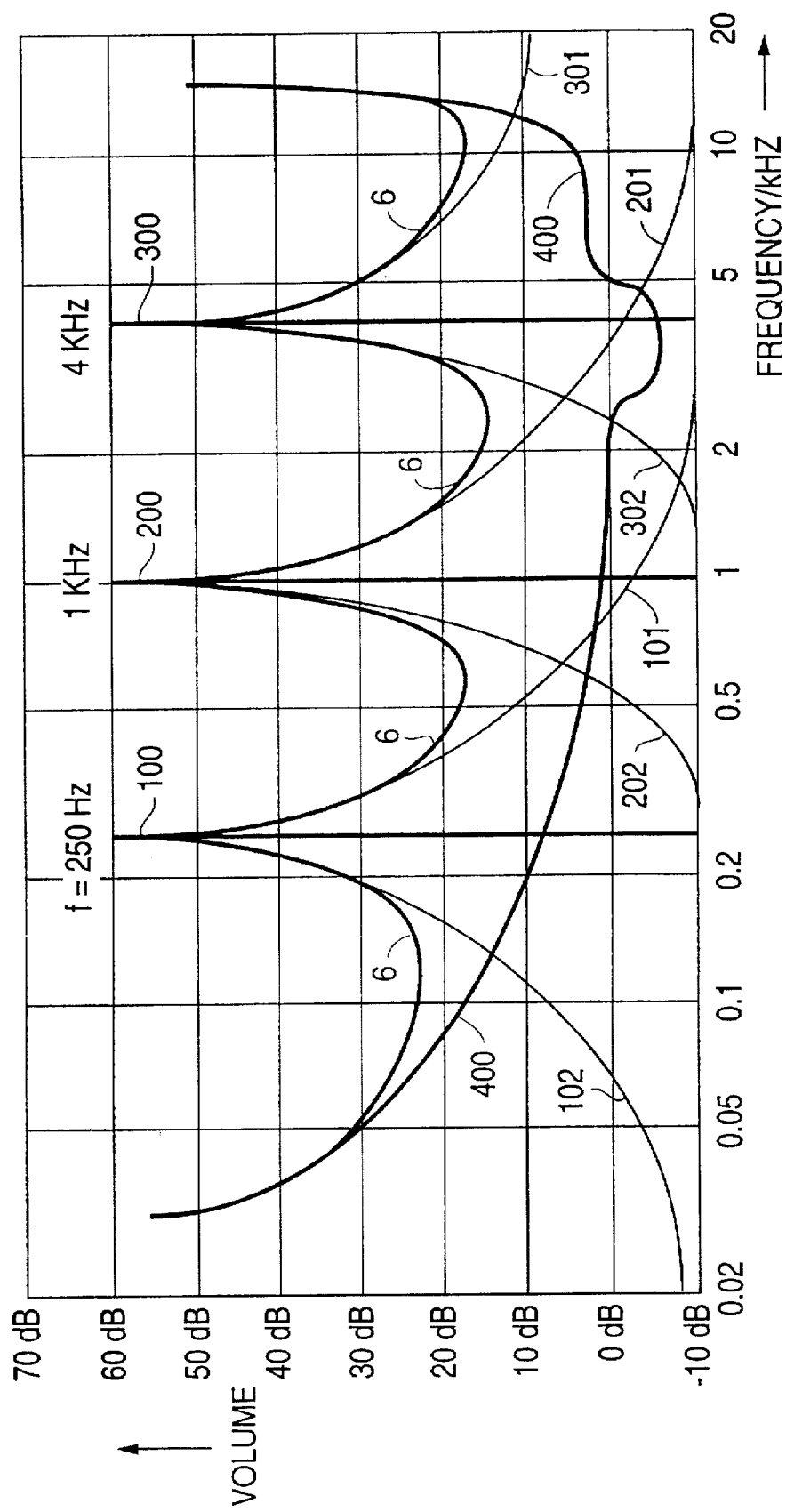
FIG. 2 depicts a frequency diagram including three maskers and the resting threshold whose joint masking effect results in the global masking threshold determined according to the invention.

In the frequency diagram of FIG. 2, three maskers 100, 200, 300 (step 1230) are plotted at 250 Hz, 1 KHz and 4 KHz, showing their upper masking edges 101, 201 and 301, respectively, and their lower masking edges 102, 202 and 302, respectively. FIG. 2 also shows the resting threshold 400. Employing the procedure specific to the invention as described below, it is possible to advantageously determine the global masking threshold 6 from the interaction of the upper and lower masking edges 101, 201, 301, 102, 202, 302 and the resting threshold 400.

To do this, in a preferred embodiment for the reduction of the calculating effort for the calculation of the global masking threshold, the following criteria are considered:

(a) Each masker 100, 200, 300, as shown in FIG. 2, has an upper and a lower masking edge 101 and 102, 201 and 202, 301 and 302, respectively. These masking edges are described by higher order polynomials. Since polynomial calculations are very complicated, these masking edges are segmented (step 1260) and these [segments] are approximated with lower order polynomials, for example, linear equations (step 1250).

(b) Since, for a calculation of the global masking threshold 6, the masking edges of the individual maskers may possibly contain level dependencies, the intensities calculated from the transformation of the audio signals into the frequency domain must be recalculated into logarithmic levels (step 1240). The logarithm formation is normally also calculated with a higher order polynomial and is thus too complicated for realization. Since it is sufficient, however, to calculate the logarithm with limited accuracy, the number of logarithmic level stages contained in the table is reduced according to the invention to a small number. These logarithmic levels are stored in a table which is then employed instead of the polynomial calculation (step 1160). If the logarithm formation is realized with the aid of splitting the intensities into mantissa and exponent, the logarithmic levels of the mantissa are stored in a table which is then employed instead of the polynomial calculation (step 1170).

(c) Not all maskers are relevant for the calculation of the global masking threshold since one masker may cover another masker. The masking edge of such a covered masker lies far below the global masking threshold with respect to level or intensity and thus no longer has a noticeable effect on the global masking threshold. For that reason, these non-relevant maskers are sorted out in a stage 50 and are no longer utilized to calculate the global masking threshold 6 (step 1020).

(d) All maskers whose masking edges, with respect to intensity or level, lie so far below the resting threshold 400 of the human auditory system that the masking resulting from the masking curve of the masker and the resting threshold is not significantly greater than the resting threshold itself, are not relevant for the calculation of the global masking threshold since the masking edge of such a masker lies far below the global masking threshold 6 with respect to intensity or level and thus no longer has a noticeable effect on the global masking threshold. Therefore, these non-relevant maskers are also sorted out in stage 50 and are no longer utilized for the calculation of the global masking threshold 6 (step 1030).

(e) It is not possible in principle to calculate a continuous curve in a digital system with numerical methods. The spectral base points for the calculation of the global masking threshold 6 are therefore fixed in such a way that they are calculated only at discrete spectral locations (step 1120).

(f) With the aid of psychoacoustics, the spectral resolution required for a calculation of the global masking threshold 6 can be reduced with respect to the masking threshold to a limited number of base points. The spectral base points for the calculation of the global masking threshold 6 are therefore fixed in such a way that they have a closer spectral spacing in the lower frequency range than in the upper frequency range (step 1270 and step 1130).

(g) For a calculation of the global masking threshold 6, the audio signal must be reproduced in the frequency domain with the aid of a transformation (stage 40, FIG. 1) in order to permit a spectral analysis of the audio signal. The spectral base points for the calculation of global masking threshold 6 are thus fixed in such a manner that they come to lie on the base points of this transformation (step 1140). Due to the greater spectral distance between the base points for the Calculation of the masking threshold in the upper frequency range, only some of the base points of the transformation are employed there.

(h) The global masking threshold 6 is calculated step by step, masker by masker, at its base points (step 1270). Since a masker generally masks to a greater degree toward higher frequencies than toward lower frequencies, the step-wise calculation of the global masking threshold 6 begins with the highest frequency masker (step 1000) so that the interruption (=abortion) criterion described in the following paragraph comes to bear as early as possible.

(i) In the step-wise calculation of the global masking threshold 6, the calculation always starts with a calculation, for the respective masker, of its spectral masking edge toward upper frequencies and then toward lower frequencies (step 1010). This permits an early interruption of the calculation of the masking percentage which, by way of the masking edge of the respective masker, contributes to global masking threshold 6. This interruption takes place as soon as the effect of the masking edge of the respective masker on the previously calculated global masking threshold 6 falls below a certain measure (=level) (step 1040).

(j) the calculation of the effect of the masking edge of a masker and the global masking threshold 6 is interrupted as soon as the intensity or the level of the masking edge of the masker at the momentarily calculated base point of the global masking threshold 6 falls below a certain measure so that it no longer has a noticeable effect on the global masking threshold 6 (step 1050).

(k) The calculation of the effect of the masking edge of a masker on the global masking threshold 6 is interrupted as soon as the intensity or the level of the masking edge of the masker at the momentarily calculated base point of the global masking threshold 6 drops a certain degree below the intensity or the level of the resting threshold 400 and thus no longer has a noticeable effect on the global masking threshold 6 (step 1060).

(l) The global masking threshold 6 is composed, as described above, of the masking effect of different individual maskers 100, 200, 300 and is formed by adding the intensities of the masking edges 101, 102, 201, 202, 301, 302 of these individual maskers (step 1070). This intensity addition normally requires a considerable amount of calculations since, based on logarithmic levels, an addition of intensities requires repeated exponentiation and logarithm formations. The addition of the intensities is thus effected with the aid of a nomogram (step 1080). The input value for the nomogram is the absolute value of the level difference between the previously calculated global masking threshold 6 and the masking edge of the momentarily considered masker (step 1090). The resulting output value of the nomogram is a logarithmic level which is added to the maximum level formed from the previously calculated global masking threshold 6 and the masking edge of the masker presently under consideration (step 1100). Since the accuracy required for the intensity addition is limited, the number of possible level addition values is reduced to a low number (step 1110). These values can be calculated in advance for the nomogram and can be employed for the truly occurring absolute level differences.

Of the above-mentioned sections (a) to (l) only some of the sections may be employed, if required, as defined in the dependent claims.

We claim:

1. A method of determining a global masking threshold used for source coding digitized audio signals having sampling values, comprising:

providing the sampling values of the digitized audio signals to a quantizer, the sampling values being one of time or spectral domain sampling values, the sampling values having permissible quantizing noise;

requantizing the sampling values with the quantizer according to the permissible quantizing noise thereof in response to a coding and requantizing control signal;

multiplexing the coding and requantizing control signal and the sampling values requantized in said requantizing step, into a time multiplexed frame in accordance with a bit rate reduction employed;

wherein the coding and requantizing control signal is derived from the sampling values by determining a global masking threshold using all relevant maskers which are tonal maskers and noise maskers, and which result from the sampling values, and using a resting threshold, the global masking threshold being determined by the following steps:

(a) converting levels of all relevant maskers into logarithmic levels and using intensities of the maskers to determine the coefficients of lower order polynomials;

(b) segmenting masking edges of all relevant maskers in individual segments with the lower order polynomials; and (c) determining the global masking threshold, step-wise, masker by masker, beginning with a highest frequency masker, at individual possible base points, from the lower order polynomials describing masking edges of the possible maskers, taking into consideration the resting threshold, using a different spectral spacing in lower, middle and upper frequency ranges.

2. A method according to claim 1, wherein the step-wise determination of the global masking threshold includes always determining first, for a respective masker, a spectral masking edge towards upper frequencies and then determining an edge towards lower frequencies.

3. A method according to claim 1, further comprising detecting maskers whose masking edges have essentially no effect on a determination of the global masking threshold because of masking edges of adjacent maskers, wherein the detected maskers are not considered in determining the global masking threshold.

4. A method according to claim 1, further comprising detecting maskers whose masking edges lie far below the global masking threshold with respect to level or intensity, wherein the detected maskers are not considered in determining the global masking threshold.

5. A method according to claim 1, further comprising detecting the effect on the determination of the global masking threshold of a masker and interrupting the determination as soon as the effect of the masking edge of the masker on the determination of the global masking threshold falls below a certain level.

6. A method according to claim 1, further comprising detecting the level or the intensity of the masking edge of a masker at a momentarily determined base point of the global masking threshold, and interrupting the determination of the global masking threshold when the detected level or intensity falls below a certain level, wherein a level or an intensity, respectively, of the masking edge has essentially no effect on the determination of the global masking threshold.

7. A method according to claim 1, further comprising detecting the level or the intensity, respectively, of the masking edge of a masker at a momentarily determined base point of the global masking threshold, and interrupting the determination of the global masking threshold when the detected level or intensity drops a certain degree below an intensity or level, respectively, of the resting threshold.

8. A method according to claim 1, further comprising adding intensities of the masking edges of the individual maskers during the step-wise determination of the global masking threshold.

9. A method according to claim 8, wherein the step of adding intensities is effected with a nomogram.

10. A method according to claim 9, further comprising determining an absolute value of a level difference between a previously determined global masking threshold and a masking edge of a momentarily considered masker, and using the determined value as an input value for the nomogram.

11. A method according to claim 9, further comprising forming a maximum level or intensity value, respectively, from a previously determined global masking threshold and a masking edge of a momentarily considered masker, and adding the formed level or intensity value to an output value of the nomogram.

12. A method according to claim 8, further comprising limiting possible intensities or level addition values to a precalcutated number that corresponds to a desired accuracy.

13. A method according to claim 1, further comprising determining spectral base points for calculation of the global masking threshold so that the spectral base points for calculation of the global masking threshold lie only at discrete spectral locations.

14. A method according to claim 1, further comprising selecting a spectral spacing of base points for a determination of the global masking threshold so that the spacing is smaller in a lower frequency range than in a middle frequency range and is greater in an upper frequency range than in the middle frequency range.

15. A method according to claim 1, further comprising reproducing a digitized audio signal in a frequency domain, and fixing spectral base points for determination of the global masking threshold so that the spectral base points for determination of the global masking threshold lie on base points of a reproduction.

16. A method according to claim 1, further comprising quantizing logarithmic levels in level stages.

17. A method according to claim 16, further comprising converting with a table intensities to logarithmic levels.

18. A method according to claim 17, wherein the table contains a number of associations between intensity values and logarithmic level stages and the method further comprises reducing the number of associations by dividing intensity values into mantissas and exponents, and by storing only the mantissas.

* * * * *